(12) United States Patent
Stoesz et al.

(10) Patent No.: US 8,326,103 B2
(45) Date of Patent: Dec. 4, 2012

(54) CABLE AND METHOD

(75) Inventors: Carl W. Stoesz, Houston, TX (US); Paul S. Zerwekh, Shawsville, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/062,588

(22) Filed: Apr. 4, 2008

(65) Prior Publication Data

US 2009/0252463 A1 Oct. 8, 2009

(51) Int. Cl.
*G02B 6/44* (2006.01)
(52) U.S. Cl. ........................................ 385/100; 385/102
(58) Field of Classification Search .................. 385/100, 385/102
See application file for complete search history.

(56) References Cited

U.S. PATENT DOCUMENTS

| | | | | |
|---|---|---|---|---|
| 4,077,577 A * | 3/1978 | Wright | ........................... | 156/428 |
| 4,229,068 A * | 10/1980 | Hodge et al. | ..................... | 385/22 |
| 4,290,987 A * | 9/1981 | Soehngen et al. | .............. | 264/41 |
| 4,409,274 A * | 10/1983 | Chaplin et al. | ................. | 428/112 |
| 4,648,168 A * | 3/1987 | Nolf et al. | ...................... | 385/135 |
| 4,754,328 A * | 6/1988 | Barath et al. | ..................... | 348/67 |
| 4,807,597 A * | 2/1989 | Tsuno et al. | ..................... | 600/177 |
| 4,812,008 A * | 3/1989 | Tokumaru et al. | .............. | 385/70 |
| 4,854,322 A * | 8/1989 | Ash et al. | ....................... | 600/347 |
| 5,002,054 A * | 3/1991 | Ash et al. | ....................... | 600/347 |
| 5,187,762 A * | 2/1993 | Matsuura et al. | ................ | 385/84 |
| 5,509,097 A * | 4/1996 | Tondi-Resta et al. | .......... | 385/113 |
| 5,905,834 A * | 5/1999 | Anderson et al. | .............. | 385/111 |
| 6,004,639 A * | 12/1999 | Quigley et al. | ............... | 428/36.3 |
| 6,017,588 A * | 1/2000 | Watanabe et al. | ........... | 427/407.1 |
| 6,019,522 A * | 2/2000 | Kim | ................................ | 385/80 |
| 6,101,703 A * | 8/2000 | Odanaka | ......................... | 29/447 |
| 6,235,087 B1 | 5/2001 | Chevalier et al. | | |
| 6,239,379 B1 | 5/2001 | Cotter et al. | | |
| 6,243,518 B1 * | 6/2001 | Lee et al. | ......................... | 385/59 |
| 6,324,742 B1 * | 12/2001 | Odanaka | ......................... | 29/447 |
| 6,361,299 B1 * | 3/2002 | Quigley et al. | ............... | 428/35.9 |
| 6,706,348 B2 * | 3/2004 | Quigley et al. | ............... | 428/36.3 |
| 7,149,393 B2 * | 12/2006 | Kerr et al. | ...................... | 385/120 |
| 7,322,421 B2 * | 1/2008 | Blacklaw | ........................ | 166/383 |
| 7,369,716 B2 * | 5/2008 | Berg et al. | ........................ | 385/12 |
| 7,428,350 B1 * | 9/2008 | Varadarajan et al. | ........... | 385/13 |
| 7,509,000 B2 * | 3/2009 | Coronado | ........................ | 385/14 |
| 7,590,321 B2 * | 9/2009 | Lu et al. | ......................... | 385/104 |
| 7,609,925 B2 * | 10/2009 | Gronvall et al. | .............. | 385/100 |
| 2001/0001623 A1 * | 5/2001 | Inada et al. | ..................... | 385/99 |

(Continued)

FOREIGN PATENT DOCUMENTS

JP 07110416 A * 4/1995

OTHER PUBLICATIONS

International Search Report and Written Opinion, Mailed Nov. 3, 2009, International Application No. PCT/US2009/038257, Written Opinion 7 Pages, International Search Report 3 Pages.

(Continued)

*Primary Examiner* — K. Cyrus Kianni
(74) *Attorney, Agent, or Firm* — Cantor Colburn LLP

(57) ABSTRACT

A method for making a cable includes creating a curvature in a conduit; pumping one or more fibers into the conduit; and securing at least one of the one or more fibers to a shortest pathway within the conduit and cable.

11 Claims, 2 Drawing Sheets

U.S. PATENT DOCUMENTS

| | | |
|---|---|---|
| 2002/0050394 A1 | 5/2002 | Clark et al. |
| 2002/0119271 A1* | 8/2002 | Quigley et al. .............. 428/36.9 |
| 2004/0096614 A1* | 5/2004 | Quigley et al. .............. 428/36.3 |
| 2005/0045343 A1* | 3/2005 | Bixenman et al. ............ 166/385 |
| 2005/0109518 A1* | 5/2005 | Blacklaw ...................... 166/383 |
| 2005/0121094 A1* | 6/2005 | Quigley et al. .............. 138/125 |
| 2006/0013981 A1* | 1/2006 | Malik et al. ................ 428/36.91 |
| 2009/0059966 A1* | 3/2009 | Mayer et al. ...................... 372/6 |
| 2009/0120600 A1* | 5/2009 | Pan et al. ...................... 162/146 |
| 2009/0202208 A1* | 8/2009 | Park ............................... 385/100 |
| 2009/0252464 A1* | 10/2009 | Stoesz et al. .................. 385/100 |

OTHER PUBLICATIONS

Schlumberger, "Fiber-Optic-Compatible Screens" www.slb.com/oilfield, Jan. 2004, Schlumberger, pp. 1-2.

* cited by examiner

CABLE AND METHOD

BACKGROUND

Real time casing imaging (RTCI) is known in the hydrocarbon recovery arts and comprises an optic fiber with fiber bragg gratings (FBG) disposed within a conduit. The conduit is commonly composed of a metallic material and may be a control line. The fiber is fixed within the conduit using a hardenable material such as epoxy to promote the transfer of strain in the conduit to the fiber, where that strain can be measured. Traditionally, the fiber is pumped into the conduit with a pumping fluid or with the epoxy itself. Pumping is done while the conduit is straight to reduce the pumping pressures necessary to move the fiber to an end of the conduit opposite the end thereof used for entry of the fiber. The completed conduit is then bent into a shape conducive to the imaging task it is meant to discharge. Alternately the fiber can be installed inside a polymer and encased within tubing during the tubing manufacturing process. While these systems work well enough to have been accepted by the art, they are not entirely reliable. The art would therefore well receive improvements.

SUMMARY

A cable includes a conduit; and one or more fibers disposed within the conduit in a consistent position therein.

A tubular having a cable in operable communication therewith and wherein the cable is positioned relative to the tubular to cause a fiber disposed therein to be located at a greatest distance from the tubular in a radially inward direction from the tubular to create a smallest bend radius for the fiber.

A method for making a cable includes creating a curvature in a conduit; pumping one or more fibers into the conduit; and securing at least one of the one or more fibers to a shortest pathway within the conduit.

BRIEF DESCRIPTION OF THE DRAWINGS

Referring now to the drawings wherein like elements are numbered alike in the several Figures.

DETAILED DESCRIPTION

Figure 1:
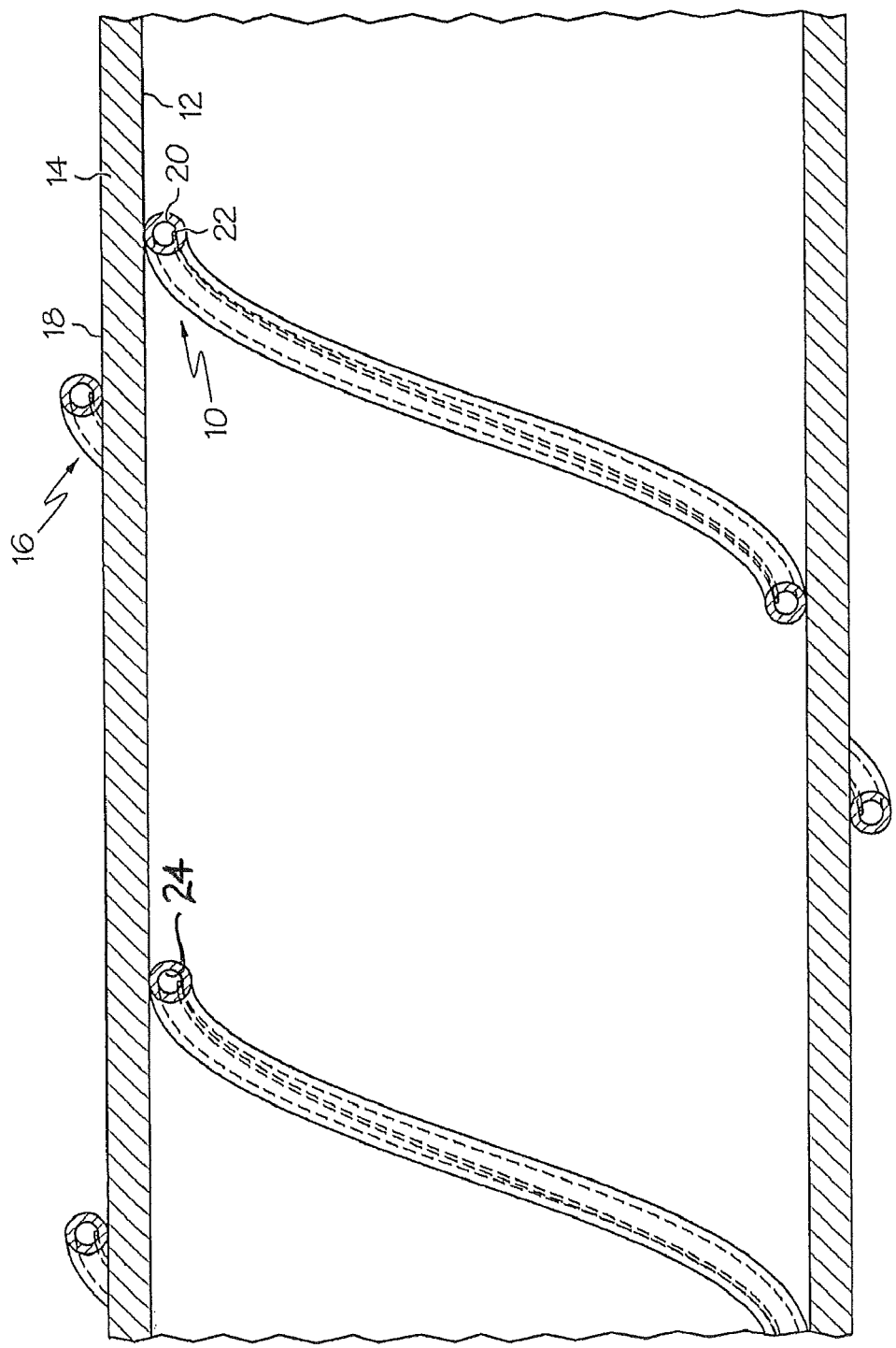
FIG. 1 is a schematic cross-sectional view of a tubular having a cable disposed thereat in accordance with the disclosure hereof.

Referring to FIG. 1, it will be appreciated that a cable 10 is illustrated as disposed at an inside surface 12 of a tubular 14 and another cable 16 is disposed at an outside surface 18 of the tubular 14. These are alternative locations for the cable or they may both be used as desired. For purposes of discussion, the cable 10 at the inside surface will be addressed more specifically. Cable 10 comprises a conduit 20 that may be constructed of any material having properties consistent with the intended use of the cable in a downhole environment. One such material is metal and thus hydraulic control line can be used. Within the conduit 20 is illustrated a fiber 22 (one or more could be used). The fiber selected for the cable is to be one that is sensitive to strain such that strain may be measured thereon from a remote location. In one embodiment, the fiber will be a fiber with one or more fiber bragg gratings (FBG).

The fiber 22 is to be relatively rigidly retained in place within the conduit 20 by a hardenable material to ensure that the fiber will "see" any strain that is placed upon the conduit 20 by the environment or other well equipment.

In one iteration, the hardenable material is initially flowable such that it can be pumped into the conduit 20 after installation of the fiber. While it is also possible to actually pump the fiber 22 with the hardenable material, it is less efficient for the overall process due to the volume of material needed to pump the fiber and the higher cost of the hardenable material. In the pumping process, a substantial amount of the hardenable material would be wasted flowing out the other end of the conduit 20.

The conduit 20 is caused to have a curvature prior to installation of the fiber 22, which curvature may be a simple or complex curve providing that it continues in a general direction such that a clearly definable shortest path can be observed therein. In one embodiment, the curvature is a helix. This creates a condition between the conduit 20 and the fiber 22 that ensures that the fiber 22 is in a consistent position within the conduit 20 along the length of the cable 10. Consistent positioning of the fiber 22 within the conduit 20 is caused by the natural tendency of the fiber to take the shortest path, that path having been dictated by the curvature created in the conduit. Consistent positioning of the fiber overcomes reliability problems of the prior art thereby rendering the cable 10 disclosed herein superior to the prior art.

Figure 2:
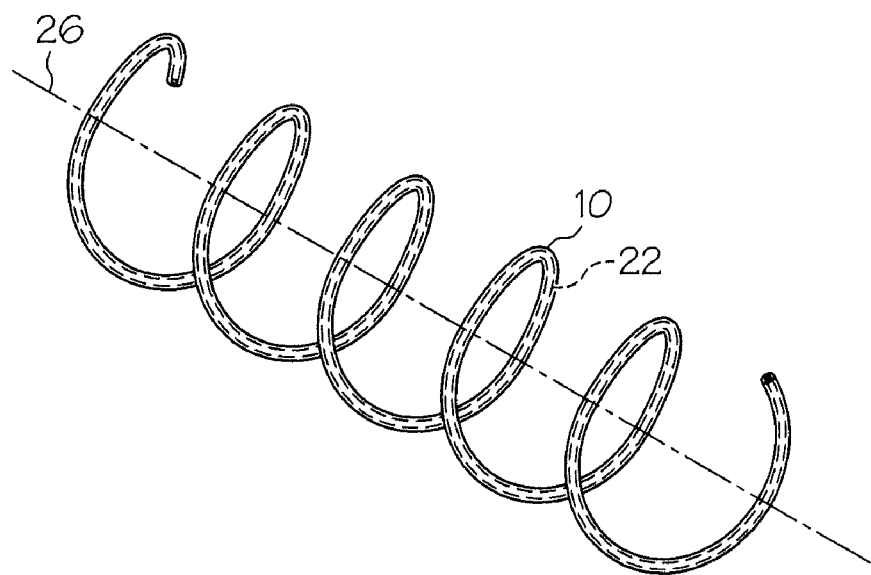
FIG. 2 is a perspective illustration of a cable in a helix within a tubular.

The shortest path through a helical conduit, for example, is the path with the smallest radius, therefore, an inside surface 24 of the conduit 20 having the smallest radius to a central axis 26 (see FIG. 2) of the helix will define the shortest path for the fiber 22 extending through the conduit 20. Because of the nature of an elongate fiber to take and remain in the position that is shortest from its origin point to its termination point, it is axiomatic that the fiber will locate itself in that position. This is a significant advantage over the prior art technique as related above because in the prior art technique, the fiber will necessarily wander through the conduit due to flow of the pumping fluid. Since no significant change in the length of the run is dictated by the conduit due to teachings that the conduit be straight for pumping fiber, it necessarily will be inconsistently located. This has been determined by the present inventor to be a significant source of error introduction into the system. Therefore, the removal of the wandering path of the fiber is of great benefit to the art.

In addition to the foregoing, it is further noted that the fiber in the helical configuration has no appreciable stress therein. This is because the FBG is put into compression on one side of the neutral axis of the fiber while it is put under tension on the other side of the neutral axis. The stresses cancel one another leaving the fiber in an optimum condition to sense externally induced strain. Another benefit to the positioning of the fiber in the shortest path is that the bend radius of the fiber is necessarily smaller. This causes the fiber to be more sensitive to strain changes and therefore more specific. Because the bend radius does have a significant effect for sensitivity of the cable it will be appreciated that the fiber positioned at the inside surface 12 of tubular 14 will be more sensitive to strain than the cable 16 at the outside surface 18. Due to the end radius effect, it is desirable, though not required, to place the cable 10 at the inside surface 12 of the tubular 14 that it is intended to measure. Because of the intended pathway of the fiber in the conduit, the fiber will necessarily be as far from the inside surface of the tubular 14 as possible consistent with each possible connection technique. More specifically, if the cable 10 is directly affixed to the tubular 14, then the fiber is spaced from the tubular by the diameter of the conduit 20 minus one wall thickness thereof. A greater distance from the tubular can be created by adding a spacer (not shown) between the cable 10 and the inside surface 12 if desired. Beneficial effects from these constructions all are based upon the bend radius of the fiber and thus design considerations should take this into account.

Figure 3:
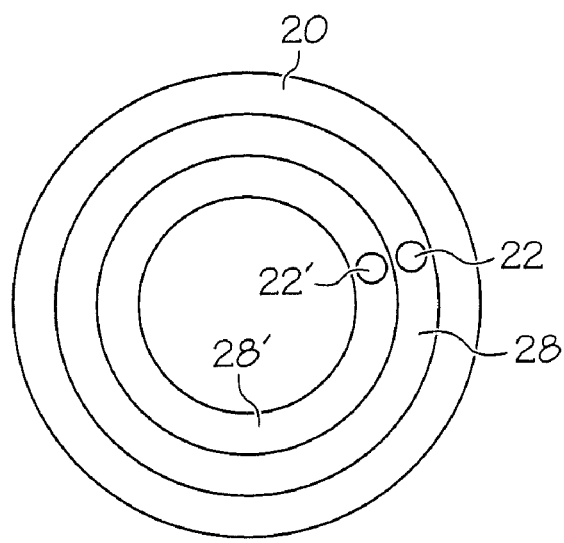
FIG. 3 is a cross-sectional representation of a cable having a plurality of hardenable material layers therein.

While the fiber 22 is reliably located within the conduit 20 and is likely to stay in that position even without any affixation within the conduit, simply because for it to move to move would require that the fiber stretch, it is still desirable to affix the fiber 22 to the inside wall of the conduit 20. This is done with a hardenable material 28 (see FIG. 3) such as, but not limited to, a material containing epoxy. The material is pumped into the conduit 20 as noted above and allowed to harden. In the hardened state, all strain imparted to the conduit is transmitted to the fiber 22. The hardenable material may completely fill the conduit, substantially completely fill the conduit, or may be configured as a tube itself. In the first and second iterations, the material is simply pumped though the conduit and allowed to harden when the conduit is full or substantially full. In the third noted iteration, however, the material is first pumped through the conduit 20 to coat the inside surface thereof and then the excess is pumped out of the fiber using a gas such as air. The coating is sufficient to affix the fiber 22 to the conduit 20 while creating another tubular structure within the conduit 20. This can be repeated to add layers of fibers and "coating tubulars" stacked within conduit 20 (additional layer indicated with primes as 22' and 28'), if desired, or alternatively, the open central tubular may be used as a control conduit, which may be filled with a communication fluid, for example, a hydraulic fluid. In such an embodiment, the control line may be employed for any use to which a prior art control line may be put. Too, the open inside of the hardenable material tubular may be used to house one or more non-affixed fibers that might be used for temperature sensing, for example. Temperature sensing fibers need not be affixed, as affixation does not affect specificity of the fibers for such purpose. In an embodiment with both a strain sensing fiber and a temperature sensing fiber, a temperature compensated strain measurement is possible for even greater accuracy in overall information obtained about the conditions within the well.

In embodiments where the conduit is particularly long, the friction of the hardenable material may be undesirably hard on the one or more fibers. More particularly, the friction may put an undue strain in the one or more fibers. In such case, it is beneficial to thin the hardenable material with a thinner. In the case of an epoxy containing hardenable material, the thinner may be acetone or Methyl Ethyl Ketone (MEK) for example. This reduces pumping pressures needed to move the material through the conduit 20 and reduces frictional stresses on the one or more fiber. The thinned epoxy is pumped through the conduit 20 as noted above and in embodiments where a coating is to be formed and the material is to be cored to create a tubular, the gas pumped through after the hardenable material functions to open the inside of the hardenable material tubular and to help evaporate the thinner (acetone, MEK, etc.).

In another embodiment, the one or more fibers are metalized in known ways so that the fiber itself is wettable by a solder. The fiber may then be affixed by heating the conduit to above the melting temperature of the solder and flowing solder into the conduit. Subsequent cooling of the conduit solidifies the solder thus permanently affixing the one or more fibers to the conduit.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A cable comprising:
 a helically curved conduit; and
 one or more optical fibers positioned immovably at inner surface of the conduit and disposed consistently at the shortest pathway through the conduit.

2. The cable as claimed in claim 1 wherein the fiber includes one or more fiber bragg gratings therein.

3. The cable as claimed in claim 1 wherein at least one of the one or more fibers is affixed to the conduit.

4. The cable as claimed in claim 3 wherein the cable further includes a hardenable material therein to affix the fiber.

5. The cable as claimed in claim 4 wherein the hardenable material is a material containing epoxy.

6. The cable as claimed in claim 4 wherein the hardenable material is thinned with a thinner.

7. The cable as claimed in claim 6 wherein the thinner is acetone.

8. The cable as claimed in claim 4 wherein hardenable material is configured as a coating on an inside surface of the conduit.

9. The cable as claimed in claim 8 wherein the coating defines an open passageway that is receptive to a communication fluid.

10. The cable as claimed in claim 8 wherein hardenable material is configured as a plurality of stacked coatings on the inside surface of the conduit.

11. The cable as claimed in claim 1 wherein the fiber is in a consistent position relative to a tubular about which the cable is disposed.

* * * * *